April 5, 1927.  J. H. BOURGON  1,623,934
VEHICLE CLOSURE
Filed Jan. 7, 1925
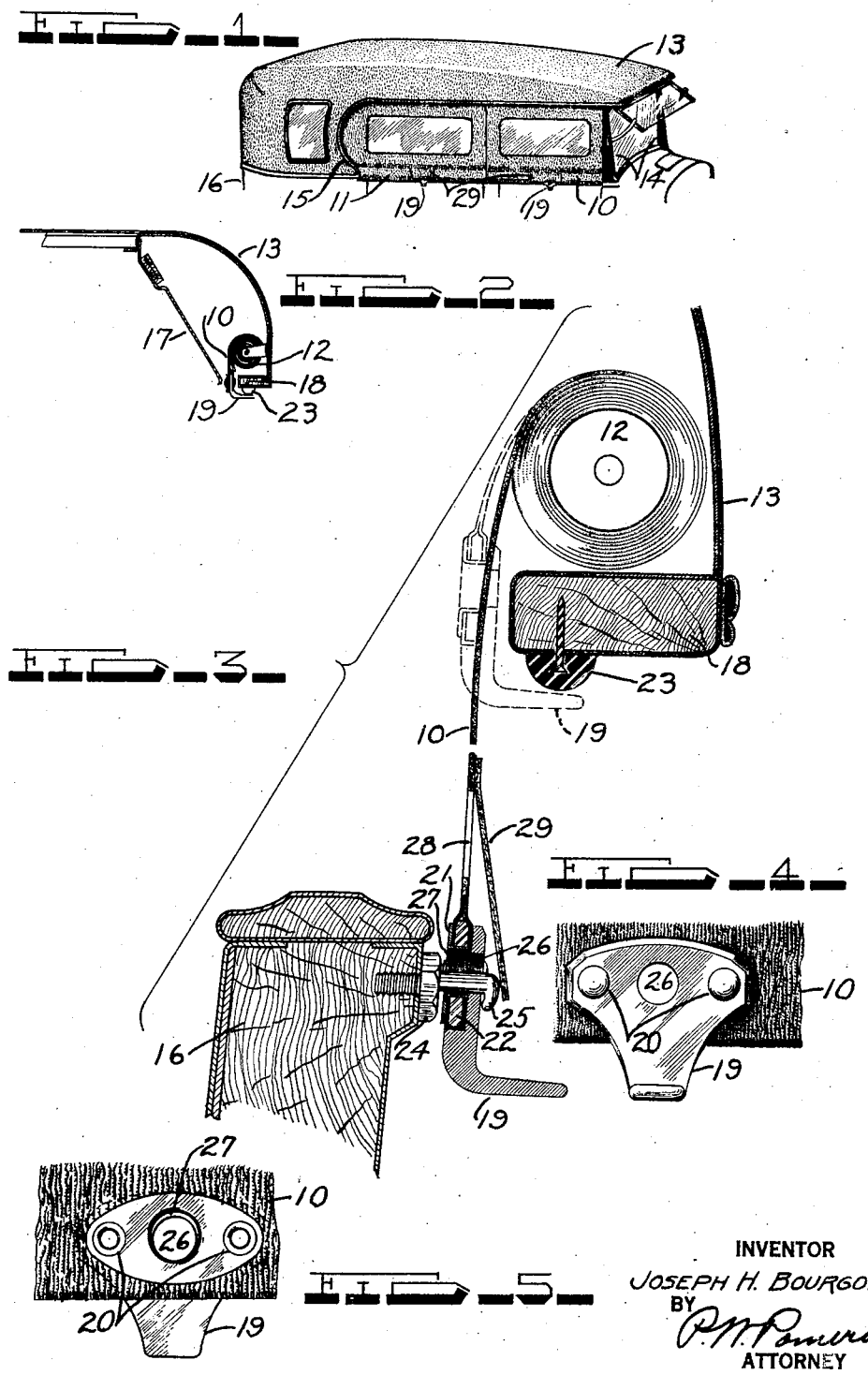
INVENTOR
JOSEPH H. BOURGON
BY
ATTORNEY Patented Apr. 5, 1927.

1,623,934

UNITED STATES PATENT OFFICE.

JOSEPH H. BOURGON, OF DETROIT, MICHIGAN, ASSIGNOR TO THE STUDEBAKER CORPORATION, OF SOUTH BEND, INDIANA, A CORPORATION OF NEW JERSEY.

VEHICLE CLOSURE.

Application filed January 7, 1925. Serial No. 1,046.

This invention relates to roller curtains for motor vehicles and the like and particularly to means for fastening or holding the curtains in lowered or operative position, much in the same manner as described in my co-pending patent application on top construction filed July 9th, 1924, Serial Number 725,062 and in respect to which this invention constitutes an improvement.

It is one of the objects of the present invention to provide a new and novel means for retaining vehicle curtains of the roller type in operative position.

Another object is to provide vehicle curtains which operate vertically into a vehicle top with means for preventing the same from disappearing completely into the top when in inoperative position.

Another object is to provide side curtains of the roller type which operate vertically into a vehicle top with a combined means for holding the same in lowered position and for preventing the bottom edges from disappearing into the top when the curtains are raised to inoperative position.

Still another object is to provide a vehicle side curtain of the roller type which operates vertically into a vehicle top, and a curtain fastener having a lip at the end portion which is of a greater thickness than the central portion for receiving a retaining member secured to the bottom edge of the curtain, the retaining member being provided with an opening, the diameter of which is slightly greater than the thickness of the end portion of the curtain fastener.

A further object is to provide a roller curtain housed in a vehicle top with an angle-shaped stop member secured to the bottom edge thereof which strikes against the bottom rail of the top when the curtain is raised, thereby preventing the same from disappearing into the vehicle top.

A still further object is to provide a roller curtain housed in a vehicle top, with an angle-shaped stop member secured to the bottom edge thereof which abuts against a rubber bumper attached to the top bottom rail preventing the same from disappearing into the top when in inoperative position and which when in operative position is adapted to be received and held on a curtain fastener secured to the side of the vehicle body.

These being among the objects of the present invention the same consists of certain features of construction and combination of parts to be hereinafter described with reference to the accompanying drawing, and then claimed, having the above and other objects in view.

In the accompanying drawing which illustrates a suitable embodiment of the present invention, and in which like numerals refer to like parts throughout the several views.

Figure 1 is a perspective view of an automobile top secured to a body showing the side curtains in lowered or operative position.

Figure 2 is a sectional view through one side of the vehicle top showing the roller curtain in raised position and the relation of the curtain shield or cover thereto.

Figure 3 is an enlarged sectional view through a portion of the vehicle top and body showing the curtain in lowered position and by the dotted lines showing the same in raised position.

Figure 4 is an enlarged front elevation of the curtain stop and retaining member, the same being secured to the bottom edge of the vehicle side curtain.

Figure 5 is a rear elevation of the structure shown in Figure 4.

In the following description, wherever inoperative position is referred to, it will be understood that it relates to the position of the curtain when raised and not in use and in referring to operative position, it will be understood that it refers to the position of the curtain when lowered and in use.

The front curtains 10 and rear curtains 11 to which the present invention applies are preferably of that type which operate on rollers 12 suitably held in the vehicle top 13 and which when operated up or down are guided in retaining grooves provided in the front top supporting members 14 and rear supporting members 15 by which the top 13 is supported on the vehicle body 16, similar to the manner illustrated and described in my previous application referred to.

As shown in Figure 2, the top 13 is provided with a curtain shield 17 which conceals the curtain rollers 12 from the view of the occupant of the automobile. Unless some means were provided, the bottom edges of the curtain 10 and 11 when raised to inoperative positions would disappear into the top 13 between the curtain shield 17 and top bottom rail 18, which would necessitate the removing of the curtain shield 17 to reach the curtains 10 and 11 in order to lower the same. To insure against this occurring at any time, an angle-shaped stop member 19 is centrally positioned at the bottom edge of each of the curtains 10 and 11 and is secured thereto by rivets 20 which pass through the bottom edge thereof and through a flanged collar or eyelet 21 on the opposite side thereof compressing the curtain edge firmly therebetween. The bottom edges of the curtains 10 and 11 are reinforced by a stiffener 22 preferably of metal to provide stiffness and to prevent the stop member 19 from pulling or tearing out of the same. When the curtain 10 or 11 is raised from operative to inoperative position the horizontal leg of the stop member 19 will strike against a resilient buffer or bumper 23, which may be of any suitable shape or of any suitable material and which is secured to the under side of the top bottom rail 18 and will thereby prevent the curtain 10 from disappearing into the top 13, as shown by the dashed lines of Figure 3 and in Figure 2. The bumper 23 functions to prevent the stop member 19 from marring the under surface of the bottom rail 10 and to eliminate noise as the curtain 10 is raised. A curtain fastener 24 threaded into the side of the vehicle body 16 which in this case is the vehicle door, provides a means for holding the curtain 10 in operative position and consists of the screw portion and an outwardly extending shank the end of which is turned downwardly to form a rounded lip portion 25 which provides a fastener to prevent the curtain from becoming disengaged with its fastening means.

The stop member 19 is provided with an opening 26 positioned centrally in respect to the opening 27 in the eyelet 21, which openings 26 and 27 are of slightly larger diameter than the lip portion 25 of the fastener 24, which allows the stop member 19 to be slipped over fastener 24 whereupon after passing over the lip portion 25, the tension provided by the spring in the curtain roller 12 draws the stop member 19 tightly up against the center portion of the fastener 24 and out against the lip portion 25 thereof, thereby holding the curtain 10 in operative position.

To permit ease in raising the curtain 10 or 11, the same is provided with an opening 28 just above the stop member 19 which opening is of sufficient width and depth to allow the operator's hand to be inserted therein, whereupon the operator is able to force the curtain 10 downwardly to disengage the strap member 19 from the fastener 24 and raise the curtain to inoperative position. A flap 29 is secured to the curtain 10 just above the opening 28 to cover the same and to prevent the ingress of a draft into the vehicle body.

In the foregoing description I have described the present invention as relating to curtains of the roller type but it is to be understood that this invention can be applied to curtains which slide up into vehicle tops equally as well as those of the roller type.

Formal changes may be made in the specific embodiment of the invention described without departing from the spirit of substance of the broad invention, the scope of which is commensurate with the appended claim.

What I claim is:

The combination with a vehicle body, a top having sides and a bottom rail extending around said sides supported by said body, and a side enclosure vertically operable into said top, said enclosure having an opening therein to permit the raising and lowering thereof from either side and a cover secured along one side to said enclosure to cover said opening, of a curtain fastener secured to said vehicle body comprising an outwardly extending shank terminating in a downwardly turned lip adapted to be received in an opening adjacent the lower edge of said enclosure below said first opening to retain said enclosure in extended position, and an angle-shaped member secured to the bottom edge of said enclosure having an opening therein matching with said second opening to receive said fastener, the horizontal leg of said member co-operating with the bottom rail of said top to prevent said enclosure from disappearing into said top when in raised position, said leg also forming a handle for the guiding of the enclosure to raised or extended positions.

Signed by me at Detroit, Michigan, U. S. A., this 31st day of December, 1924.

JOSEPH H. BOURGON.